US005244222A

United States Patent [19]

Benoit

[11] Patent Number: 5,244,222

[45] Date of Patent: Sep. 14, 1993

[54] COLLAPSIBLE WHEELCHAIR

[76] Inventor: Robert Benoit, Billy les Chanceaux, 21450 - Baigneux les Juifs, France

[21] Appl. No.: 675,925

[22] PCT Filed: Nov. 7, 1989

[86] PCT No.: PCT/FR89/00575

§ 371 Date: May 2, 1991

§ 102(e) Date: May 2, 1991

[87] PCT Pub. No.: WO90/04957

PCT Pub. Date: May 17, 1990

[30] Foreign Application Priority Data

Nov. 7, 1988 [FR] France ............................... 88 14507

[51] Int. Cl.$^5$ ............................................. B62B 11/00

[52] U.S. Cl. ................................ 280/250.1; 280/647; 297/44

[58] Field of Search .................... 280/42, 242.1, 250.7, 280/647, 650, 657, 304.1; 297/42, 44

[56] References Cited

U.S. PATENT DOCUMENTS 2,485,016 10/1949 Rideout ................................ 297/45
4,770,432 9/1988 Wagner ........................... 280/250.1
4,867,506 9/1989 Chavez ....................... 280/304.1 X
4,917,395 4/1990 Gabriele ......................... 280/250.1

FOREIGN PATENT DOCUMENTS 8629436 4/1987 Fed. Rep. of Germany .
2252838 6/1975 France .
2193437 10/1988 United Kingdom .
8604230 7/1986 World Int. Prop. O. .

*Primary Examiner*—Joseph D. Pape
*Attorney, Agent, or Firm*—McAulay Fisher Nissen Goldberg & Kiel

[57] ABSTRACT

This invention relates to a collapsible wheelchair (1) having a chassis (2) composed of two separate, lateral symmetrical sides (6) each including at least one virtually vertical upright bar (7), an upper arm (12), a lower arm (15) a carrying wheel (10) at the rear of the chassis and a guiding wheel (17) at the front of the chassis. The upper and lower arms (12, 15) are solid with the upright bar (7) and the lateral sides are only connected by the joint action of a seat (3) and a back (4), each including two rigid and symmetrical half-pieces (18, 28), articulated between each other following a median axis respectively of seat (3) and back (4).

8 Claims, 4 Drawing Sheets

COLLAPSIBLE WHEELCHAIR

This invention relates to a seat, chair or wheelchair that can be folded from an unfolded position for use to a folded position when not in use.

Such wheelchairs are already known and they generally include a chassis equipped with two carrying wheels and two guiding wheels composed on one hand of two upright bars to which is connected a back, often of a flexible material and on the other hand of two lateral sides to which is connected a seat generally made of canvas, and finally a set of articulated cross braces enabling the wheelchair to be folded by bringing its two sides together.

In this respect the French Patent FR-A-2.252.838 describes a wheelchair with a rigid seat and back, the characteristic of which is to be collapsible; this particular wheelchair is composed of two symmetrical parts following a vertical axial plane joined together by two articulation sets, one at the rear of the back and the other under the seat. Such a wheelchair already has an important advantage over wheelchairs known to date, in as far as it offers a seat and a back of a rigid material while enabling the unit to fold easily. But in spite of this, such a wheelchair has the drawback of being relatively heavy and expensive due to the double articulation it includes and which increases the weight of the chair which, by nature, is intended to be transported often by the disabled person him/herself.

The collapsible wheelchair proposed according to this invention significantly eliminates the above-mentioned drawbacks in that it eliminates any cross brace from the articulation allowing the unfolding of the rigid seat and rigid back of a collapsible wheelchair. In this respect, according to the invention, the collapsible wheelchair which is equipped with a chassis composed of two separate identical lateral sides each including one virtually vertical upright bar, a lower arm bearing a carrying wheel at the rear and a guiding wheel at the front, and a higher arm—the said higher and lower arms being solid with the virtually vertical upright bar, is characterized in that the lateral sides are only joined together by the joint action of a seat, a back and a foot rest including one or two parts articulated between each other, the seat and the back both being composed of two symmetrical, rigid half-pieces articulated between each other along the median axis respectively of the seat and the back.

According to a preferred mode of the invention, the two half-pieces of the seat and the back are rigid parts of a virtually general rectangular shape forming respectively both the seat and the back, with a rectangular cross-section and a second central part with a virtually triangular cross-section offering an upper side, a lateral side perpendicular to the upper side and a lower sloped side, the external wing including on its external edge a tubular arrangement acting as a hinge to associate in rotation the seat or the back with the chassis, the central part of the half-pieces being substantially, although not exclusively, equipped with tubular eyelets placed along the intersection between the lateral side and the lower side, to form the central hinge between the two half-pieces of the seat or back.

Such a collapsible wheelchair is very easy to fold since, in lifting the central hinge between the two half-pieces of the seat, the two lateral sides of the chair come together and cause the central hinge to fold between the two half-pieces of the back. The wheelchair is thus completely folded and by a reverse operation, just as easy, it is unfolded and ready to use.

According to a first variant each lateral side of the chassis can be formed by a generally quadrangular shaped frame, a first side of which corresponds to the seat, a second side extended upwards corresponds to the back and a third side extended downwards and curved towards the front correspond to the foot rest; the carrying wheel is mounted close to the lower top of the back side and the guiding wheel, under the fourth side which is preferably parallel to the seat side. This chassis can be made of a tubular metal structure for example.

According to a second variant, each lateral side of the chassis is mainly composed of an elbowed side bar offering a rising part on which is articulated the back and a low part located under the seat, the carrying wheel being mounted on the side bar in its elbowed part, the guiding wheel under the side bar in its low part and the foot rest on a short arm solid with the front part of the side bar; another arm coming from the rising part of the side bar juts out from a point on the rising part of the side bar located approximately in the lower third of this part. The assembly of the side bar and seat and foot rest arms can, for example, be made of folded sheet metal, in profiles or tubular structure, screwed or welded.

Thus built, the wheelchair according to this invention offers the advantage of providing remarkable comfort for the user due to the special rigidity of its seat which also procures the general suspension of the wheelchair thanks to a certain reversible elasticity resulting from the chair design in two rigid half-pieces and simultaneously from the elimination of any triangulation of the chassis which, as known, does not permit any elastic deformation.

In addition, it is attractive and its easy collapsible system allows any imaginable form of chassis.

Finally, it is very light and any kind of upholstery can be adapted to its rigid parts.

As a non limitative example, hereunder will be described various elements of this invention with reference to the attached drawings in which.

Figure 1:
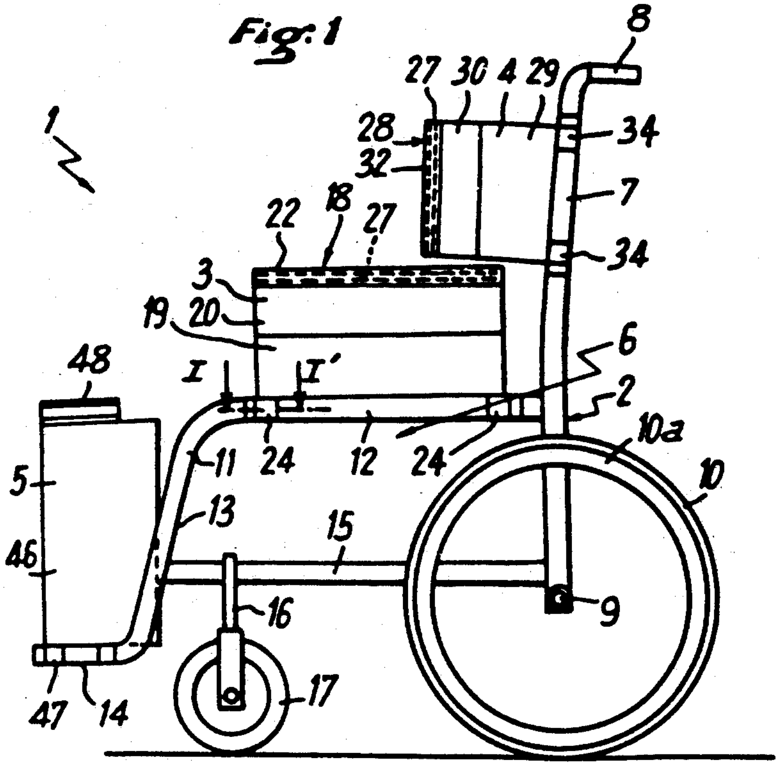
FIG. 1 is a front view of the wheelchair according to the first variant of the invention in its folded position, not in use.
Figure 5:
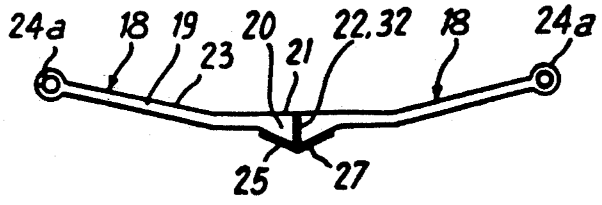
FIG. 5 is a side view similar to FIG. 3, according to another embodiment of the seat of the wheelchair according to this invention.
Figure 6:
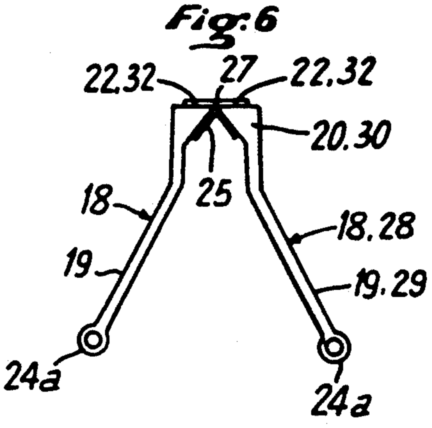
FIG. 6 is a side view of the folded seat of the wheelchair according to FIG. 5.
Figure 7:
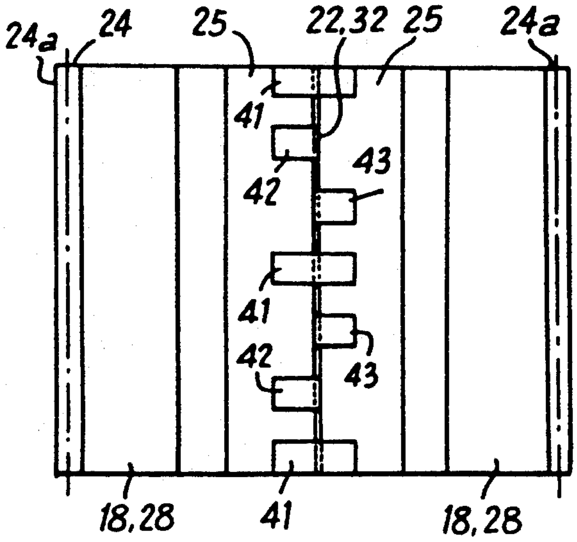
Figure 8:
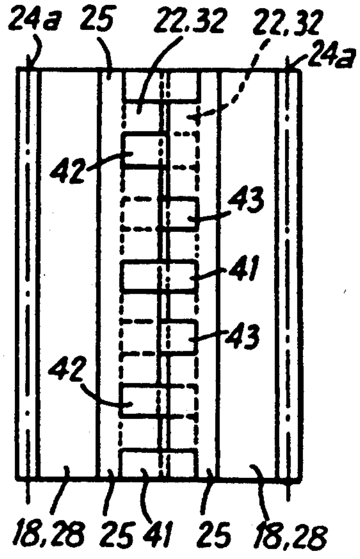
Figure 9:
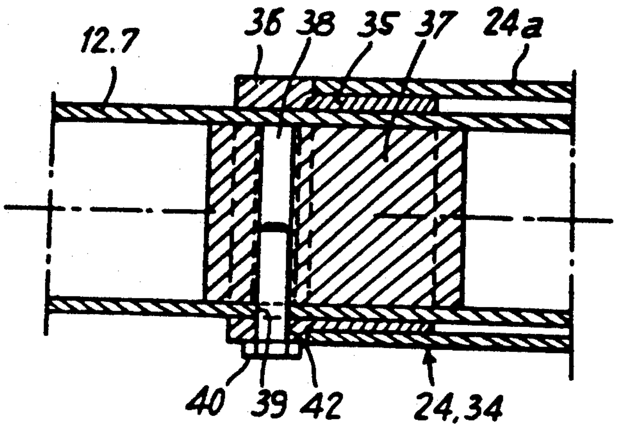
Figure 10:
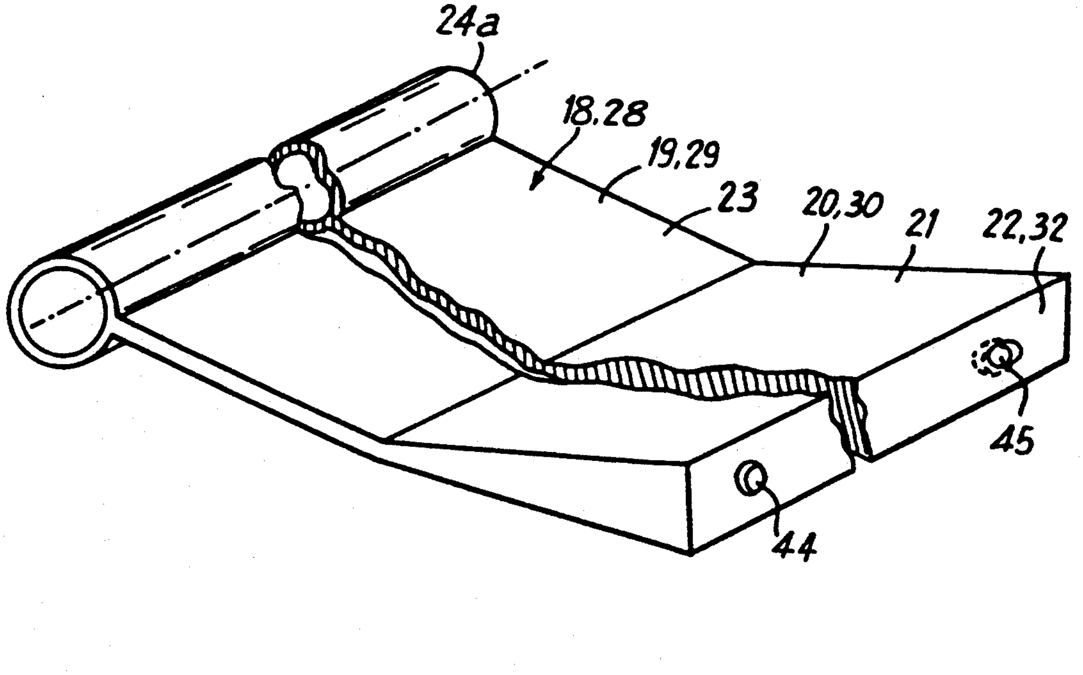
Figure 11:
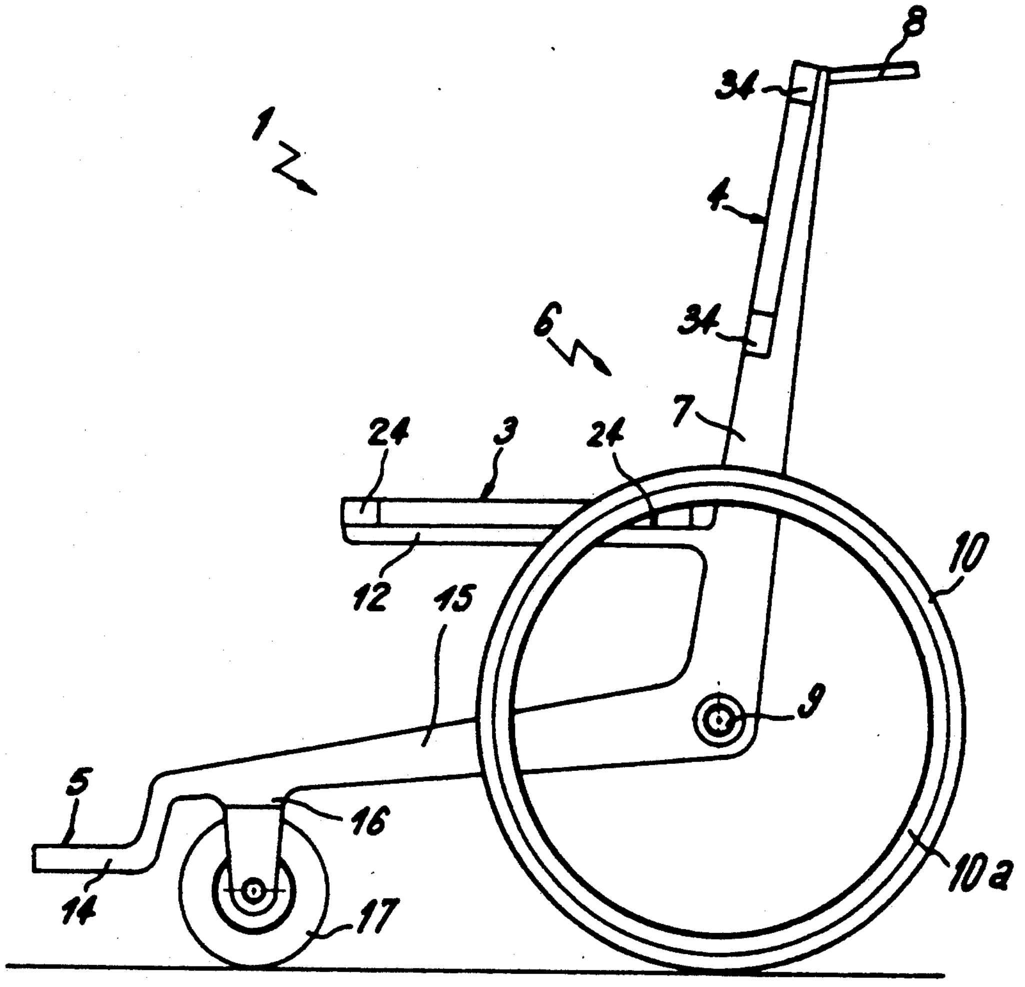

FIG. 7 is an underneath view, on a larger scale, of the embodiment shown in FIGS. 5 and 6, the seat of the wheelchair being unfolded, FIG. 8 is a general view of the seat of FIG. 7, folded, FIG. 9 is a cutaway view, following line I—I' of FIG. 1, of the extended hinge of the wheelchair, FIG. 10 is a perspective view, on a larger scale, of the half-piece forming the seat and the back of the wheelchair according to the invention, FIG. 11 is a general side view of the second variant of the wheelchair according to the invention in its unfolded position.

Figure 2:
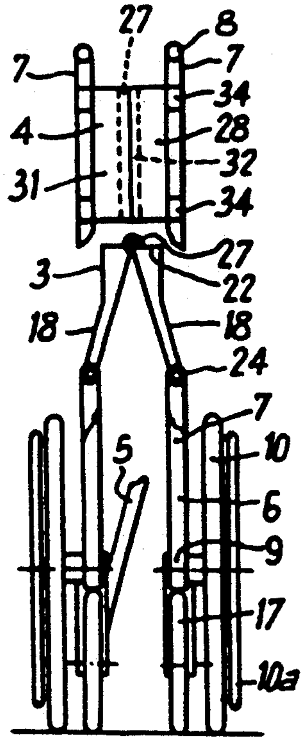
FIG. 2 is a partially exploded side view of the back of this same wheelchair, also in folded position, not in use.

According to a first variant, this invention concerns a collapsible wheelchair 1, according to the FIGS. 1 and 2, composed of a chassis 2 including a real seat 3, located, when in its unfolded position, in a horizontal plane, of a back 4 in a virtually vertical plane and of a foot rest 5 also in a virtually horizontal plane, at a lower level than that of the seat 3.

According to the invention, the chassis 2 is composed of 2 lateral symmetrical sides 6, totally separated from each other, which allows their mass production. These 2 lateral sides 6 are mounted in planes parallel to each other and perpendicular to the virtually horizontal plane of the seat 3 and of the foot rest 5, as well as to the vertical plane of the back 4, the said back 4, seat 3 and foot rest 5 forming the essential connecting elements of the lateral sides 6 of the chassis 2.

Each lateral side 6, according to a preferred (but non limitative) embodiment of the wheelchair 1 of the invention, a virtually vertical upright bar 7, carrying at the end of its top part a handle 8, horizontal or slightly sloped, in relation to the horizontal, towards the front of the wheelchair 1, so that a person accompanying the wheelchair's user has a good grip.

The vertical upright bar 7 carries at its far lower part, opposite the end carrying the handle 8, a bearing 9, carrying a wheel 10 with a large diameter, bearing down on the ground. This wheel 10 is doubled in parallel by a drive wheel 10*a* solid with the carrying wheel 10 of the wheelchair 1.

Each lateral side 6 of the chassis 2 then includes a tubular element 11 in the shape of an "S", the upper end of which is rigidly solid with the upright bar 7 and the upper horizontal arm 12 of which serves as support to the seat 3 such as detailed thereafter.

The central part 13 of the "S" shaped element 11 is directed downwards, slightly sloped forward and connected to a short arm 14, virtually horizontal or slightly sloped downwards and receiving the foot rest 5. The central part 13 of the "S" element 11 is equipped with a horizontal crossbar 15 joining the vertical bar 7.

The crossbar 15 bears a fork 16 carrying a front guiding wheel 17 orientable around a vertical axis. This front wheel 17 is of a much smaller diameter that the carrying wheel 10. It is obvious that the fork 16 can be moved along the crossbar 15 as far as required.

It results from the previous description that the lateral sides 6 of the wheelchair, before assembly, are totally separate one from the other.

According to the invention, the seat 3 of the wheelchair 1 on one hand and the back 4 on the other hand are of a virtually identical design, the sole difference of which resides in the smaller length of the back 4 compared with the seat 3, in the vertical direction for the back 4 and horizontal for the seat 3, parallel to the two lateral sides 6 of the chair 1.

According to the invention, the seat 3 is composed of two rigid half-pieces 18, rectangular in shape, symmetrical, one on the right, the other on the left of the seat 3. Each half-piece 18 is composed of a first part forming the external wing 19 of the seat and a second central part 20, making an obtuse angle between them, slightly smaller than 180°.

The transverse cross-section of the external wing 19 of the half-pieces 18 is rectangular, while the transversal section of the central part 20 is triangular, offering a flat upper surface 21, and extreme surface 22 perpendicular to the upper surface 21 and a lower, sloped, surface 25.

The upper surface 23 of the external wing 19 is slightly sloped in relation to the upper surface 21 of the central part 20, of a same value of angle as between the two parts 19, 20 of the seat 3.

In addition, the external wing includes on its free external edge a tubular arrangement 24*a* which enables it to slide onto the upper arm 12 of the "S" element 11 used as support to the seat 3.

Figure 3:
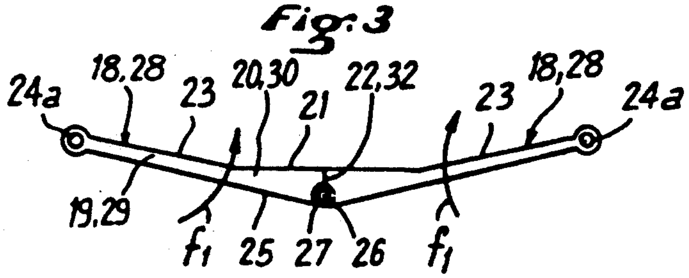
FIG. 3 is a side view, on a larger scale, of the seat of the wheelchair in its unfolded position.
Figure 4:
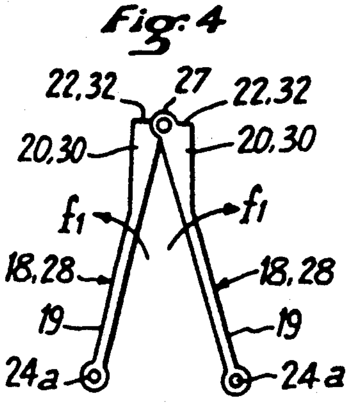
FIG. 4 is a side view of the seat according to FIG. 3 in its folded position, not in use.

In a first embodiment of the chair 1 according to the invention including a seat 3 and a back 4 obtained by plastic injection, the central part 20 is equipped at the intersection of the extreme surface 22 and the inside surface 25, with a series of tubular eyelets 26 with the same inner diameter alternating between the two coaxial right and left half-pieces 18 of the seat 3 fitting onto a same core to form a central hinge 27, associating the two half-pieces 18 of the seat 3 in a tipping position between each other; in this way, the central hinge 27, placed at the intersection of the lower surfaces 25 of the two half-pieces 18 only allows an upward rotation of the half-pieces 18 such as shown by the arrows f1, bringing the seat 3 from folded station (FIGS. 4 and 6) to an unfolded station (FIGS. 3 and 5). During this upward rotary movement of the two half-pieces 18, the tubular arrangements 24*a* of the outside wings 19 of the half-pieces 18, rotate round the upper arm 12 of the "S" element 11, to form an external hinge 24 between the seat 3 and the lateral side 6 of the chassis 2.

In a lowered position of the seat 3 shown in FIGS. 3 and 5, the two upper sides 21 of the central parts 20 of the two half-pieces 18 are coplanar and horizontal. The two upper sides 23 of the two external wings 19 of the two half-pieces 18 being slightly directed upwards, the seat 3 offers a curve that can be upholstered to improve the seating conditions of the user.

In this position, the tubular arrangements 24*a*, associated with the upper arms 12 of the "S" element 11 of each of the two lateral sides 6 of the chassis 2 are in their relative position the furthest apart and the wheelchair 1 is ready for use. It can be noted that in this situation, the two half-pieces 18 being in contact by their far surfaces 22 give the stability to the seat and consequently the rigidity and stability of the wheelchair.

In addition, when the two half-pieces 18 of the seat 3 are lifted to fold the seat 3 and with it the wheelchair 1 as it has been mentioned, the back 4 follows a similar collapsible movement towards the front of the chair 1 and on the contrary, when the seat 3 is unfolded bringing the far surfaces 22 of the half-pieces 18 of the seat 3 one against each other, the two half pieces 28 of the back 4 unfold in the same way by rotation round the central hinge 27 connecting them; the far surfaces 32 of the half-edges 28 stretching out in length parallel to the two upright bars 7 of the chassis 2 also come together to form the back 4, composed as a seat 3 by a central part 30 and an external wing 29 equipped on its edges with hinges 34 allowing a rotation round a vertical upright bar 7 of the chassis 2.

According to a second form of execution of the proposed invention, the seat 3 and the back 4 are made of carbon fibre or glass fibre. These materials are highly resistant and in particular very light, which is a decisive argument for the production of a wheelchair 1 according to the invention. On the other hand, due to the difficulty of machining such materials, it is not easy to obtain a bore hole to receive the axis forming the rotation hinge between the mobile parts.

According to the invention, and in reference to FIG. 9, the articulations of parts 18, 28 in rotation on the tubular structures 12 and 7 of the chassis 2 are obtained by means of a set of rings 35, preferably made of a synthetic material, positioned by precise sliding, in the right place on the tubular structure of the chassis 2, whether it is the upright bar 7 for the back 4 or the arm 12 for the seat 3. These rings 35 are mounted at the two ends of the tubular parts 24*a* of the hinges 24, 34 of the seat 3 and of the back 4, previously fitted onto the structural elements 12, 7 so that the said hinges 24, 34 can rotate freely, Without play, on the rings 35 which are also equipped with a circular shoulder 36 to obtain on one hand an axial stop for the tubular ends 24*a* of the hinges 24, 34 and on the other hand a sufficient bearing area for the solidarization of the said rings 35 on the structural elements 12, 7 of the chassis 2. As a complement, inside this structure 12, 7 and perpendicular to each articulation formed by the hinges 24, 34 we have a core 37, preferably made of cylindrical shaped metal and with a diameter such that it penetrates easily into the inside of the structure 12, 7. This core 37 includes, radially, a threaded hole 38 which is positioned perpendicular to drilled hole 39 made for this purpose in the fixed structure 12, 7 and a drilled hole 42 also provided in the shoulder 36 of the rings 35. A screw 40 crosses these holes 39, 42 and screws into the threading of the threaded hole 38 of the core 37 to make solid each ring 35 with the fixed structure 12, 7; in this way, the hinges 24, 34 are in rotation without any clearance on the rings 35 thus substantially providing the axial stop device of the seat 3 and of the back 4 mounted on the chassis 2 of the wheelchair 1. It can be noted that the assembly that has just been described is particularly interesting as it avoids the ovalization of the rotation guides which is generally responsible for the difficulties of rotation between parts, creating a disagreeable inconvenience for the user of the wheelchair according to the invention.

For the same reasons resulting from the difficulties of machining composite materials, it has been decided, in this embodiment of the wheelchair 1 according to the invention, to replace the central hinges 27 between the half- pieces 18 of the seat 3 and 28 of the back 4 by straps stuck alternatively onto the two lower sides 25 and the two far sides 22, 32 of the two joining half-pieces 18,28. In this way, we shall alternatively use (FIGS. 7 and 8) a strap 41 stuck to the two lower sides 25, followed by a strap 42 partly stuck on the lower side 25 of the left half-piece 18, 28 and partly on the far side 22, 32 of the right half-piece 18, 28, then a strap 43 partly stuck on the lower side 25 of the left half-piece 18, 28, opposite each other, so as to form, by repeating as often as needs be, the alteration of the straps 41, 42, 43, the seat 3 or the back 4.

Under these conditions of realization, the half-pieces 18, 28 will be substantially equipped with means of centering when they are in an unfolded position of use; in this respect, and according to FIG. 10, each far side 22 or 32 of the two half-pieces 18 or 28 respectively forming the seat 3 and the back 4 is equipped on one side, for example on the left, with a point 44 and on the right with a crater 45 whose hollow shape matches the point 44 so that when the wheelchair is unfolded the half-pieces 18, 25 come, into contact by their far side 22, 32 opposite each other, point 44 fitting into the crater 45 of the other and reciprocally.

According to another characteristic of the invention, the foot rest 5 of the wheelchair 1 according to the invention, is composed of a plate or board 46 (FIG. 1) in one piece over the whole width of the wheelchair, fitted to one of the short arms 14 of one of the lateral sides 6 of the chassis 2 by hinges 47 which allow it to tip upwards from a horizontal position of use to a vertical rest position. In the position of use, the foot rest 5 fits by an elongated hook 48 onto the other short arm 14 of the chassis 2. This elongated hook 48 preferably clips onto the said short arm 14 onto which it comes to rest when the wheelchair is in its unfolded position of use.

In the folded position of the wheelchair 1 the foot rest 5 tips upwards whilst in its unfolded position of use the foot rest 5, connected to one of the short arms 14 of the chassis 2 by the hinges 47 and to the other short arm 14 by clipping the elongated hook 48 serves as an extra means of spacing between the lateral sides 6 forming the chassis 2 of the wheelchair 1.

The foot rest can be formed of two articulated half elements on the lower front parts 14 of the two lateral sides 6. These two half elements can either be articulated between each other like seat and back or be made separate and preferably attachable by any suitable device when they are in the position of use.

In addition, the seat such as it is shown in FIGS. 1 and 2 is designed like a chair which facilitates the access to the drive wheels 10*a*. However, if the user must be firmly held onto the seat, means of holding or attaching can be provided such as arm rests that can be folded in rest position along the upright bars 7.

It is obvious that a seat such as that shown in FIGS. 1 and 2 is easy to use and facilitates the approach to a bed, a table, a toilet seat, a washbasin, a car and the transfer from the wheelchair to a classical seat or bed or in and out of a car.

In reference to FIG. 11, we will describe a second variant of the wheelchair according to the invention. The elements identical to those of the previous figures or equivalent have the same reference numbers. In FIG. 11, seat 3, back 4 and foot rest 5, are unfolded. The seat is mainly composed of two sides 6 as in the previous examples, two carrying wheels (and their drive wheel 10*a*) and two guiding wheels 17.

The sides 6 are connected by the seat 3, the back 4 and the foot rest 5 which can be realized as described above.

The seat 3 is articulated at 24 on the lateral sides 6 and the back 4 at 34. The seat 3 is articulated on the lateral sides 6 at 24 and on the back 4 at 34.

Each side 6 is mainly formed by an elbowed side bar composed of a virtually vertical upright bar 7 corresponding to the back 4 and of a lower arm 15, virtually horizontal, on the end of which is mounted the foot rest 5 on a short arm 14, itself elbowed to carry the foot rest 5 near the ground. The carrying wheel 10 is mounted at 9 near the elbow of the side bar formed by the arm 15 and the vertical upright bar 7, and the guiding wheel 17 under the arms 15 towards the front at 16 close to the foot rest 5 and its support 14.

The carrying wheel 10 and its coaxial drive wheel 10*a* are mounted on a bearing solid with the side bar.

An arm 12 sticking out perpendicularly from the vertical upright bar 7 of the side bar at an anchoring point located approximately within the lower third of the said upright bar 7 stretches horizontally towards the front of the wheelchair 1 within the plane of each lateral side 6 to support the seat 3.

As in the first variant, the seat 3 is articulated at 24 on the upper arm 12 in an overhanging position and the back 4 on the upright bar 7 at 34.

According to a preferred execution of the invention, the assembly of the sides 6 formed by the upright bar 7 and the arms 12 and 15 can be made of welded folded sheet metal, of welded screwed profiles or of mounted light alloy. In any case, the cross-section of the various parts 7, 12, 15 composing the sides 6 can be rectangular or opened in a V or M shape. Each part can be a constant or variable section depending on the mechanical stresses and in particular on the bending stresses mainly due to the load and to the tensile strength due especially t the reaction of the ground which can be very irregular.

Thus the articulations 24, 34 may only concern a part of the section of the support element (respectively 3 and 6) as shown in FIG. 11.

It can be noted that the lower arm 15 plunges preferably downwards and forwards to clear the space under the seat 3 inasfar as possible and to facilitate the approach movements of the user.

Handles 8 are provided as in the previous examples.

The guiding wheels 17 can be mounted classically according to the invention. It is better for them to be of a small diameter to facilitate movements. However, we are limited by the bumps in the ground which are not compatible with wheels of too small a diameter.

The arm 14 of the foot rest 5 can be fixed to the lateral side 6. It is possible for it to be removed, for example by sliding onto or into the arms 15, to fold upwards (which is an advantage for users with short legs) or to be adjustable in height.

It can also be noted that the lateral sides 6, the seat 3, the back 4, the foot rest 5 and a large part of the wheels 10, 10*a* and 17 can be realized in reinforced plastic, for example carbon or glass-fiber, giving a transparency to X-rays, which is a particular advantage especially in hospital where it will allow a patient to remain in the wheelchair to undergo certain examinations, such as X-rays for example.

It can also be noted that if the supports 14 of the foot rest 5 are removable, and therefore interchangeable at the end of the lower arm 15, a number of accessories can be mounted and removed at the end of the upper arms 12 (ashtray, tray, supports, cameras, etc.), the arm ends being shaped suitably.

I claim:

1. A collapsible wheelchair (1), comprising:

a chassis (2) formed of two identical separate individual lateral sides (6) each including at least one virtually vertical upright bar (7), an upper arm (12) and a lower arm (15), said upright bar (7) carrying a carrying wheel (10) at the back of said chassis (2) and a guiding wheel (17) at the front of said chassis;

said upper and said lower arms (12, 15) being fixed to said upright bar (7);

a seat (3) a back (4) and a foot rest (5);

said seat (3) including two rigid symmetrical half-pieces (18) articulated between each other and connecting said two separate lateral sides together in a horizontal direction according to a median axis of said seat between said upper horizontal arms (12);

said foot rest (5) being connected at one end thereof to one of said lateral sides;

said back (4) including two rigid half-pieces (28) articulated between each other and connecting said two virtually vertical uprights bars (7) of separate lateral sides (6) together in a vertical direction according to a median axis of said back between said vertical uprights bars (7); and each of said two half-pieces (18, 28) forming said seat (3) and said back (4) including a first part having a rectangular transverse cross-section forming at least one of an outside external wing (19, 29) of at least one of said seat (3) and said back (4) and a second central part (20, 30) having a virtually triangular transverse cross-section offering an upper side (21) and a lateral side (22, 32) perpendicular to said upper side (21) and a lower sloped surface (25);

said outside external wing (19, 29) including on its external edge a tubular arrangement (24*a*) acting as hinge (24, 34) for associating in rotation said at least one of said seat (3) and said back (4) respectively to said upper arm (12) and upright bar (7), the median part (20, 30) being provided with a central hinge (27) stretching along the intersection between said lateral side (22, 32) and a lower side (25) in such a way that when the wheelchair (1) is in its unfolded position of use, the two half-pieces (18, 28) come against each other by their lateral sides (22, 32) and when the armchair (1) is in its folded position, said lateral sides (22, 32) are in the same plane.

2. The wheelchair (1) according to claim 1 wherein the upper side (23) of the outside wing (19, 29) of each half-piece (18, 28) offers a slight slope in relation to the upper side (21) of the central part (20, 30) of the said half-pieces (18, 28) so that when the wheelchair (1) is unfolded the two half-pieces (18, 28) form a curved seat giving a suspension effect and comfort to the user.

3. The wheelchair (1) according to claim 1, wherein the articulation of the seat (3) and the back (4) respectively on the upper arm (12) of the lateral side (6) and on the upright bar (7) of the chassis (2) is formed by two rings (35) mounted at both ends of the hinges (24, 34) so that the tubular arrangement (24*a*) can freely and without clearance rotate on the said rings (35), the said rings fitting snuggly onto the fixed tubular structure (12, 7) of the wheelchair (1) inside of which is a hub (37) radially drilled by a threaded hole (38) perpendicular to a drilled hole (39) in the fixed structure (12, 7) of the chassis (2) and of a drilled hole (42) radially made in a shoulder (36) of the rings (35) into which is screwed a screw (40) which makes the rings (35) solid with the fixed structures (12, 7) of the chassis (2).

4. The wheelchair (1) according to claim 1, wherein the central hinge (27) between the two mobile parts (18, 28) is realized by means of straps arranged alternatively so that to one strap (41) stuck on the two lower sides (25) of the half-pieces (18, 28) succeeds a strap (42) stuck partly to the lower side (25) of the left half-piece (18, 28) and partly on the lateral side (22, 32) of the right half-piece (18, 28) and a strap (43) partly stuck on the lower side (25) of the right half-piece (18, 28) and partly on the lateral side (22, 32) of the left half-piece (18, 28), this sequence being repeated as many times as necessary over the whole length of at least one of the seat (3) and said back (4).

5. The wheelchair (1) according to claim 1 wherein characterized in that each lateral side (22, 32) of the half-pieces (18, 28) is provide don one side, for example on the left, with a point (44) and on the right with a crater (15), the hollow form of which matches the point (44) so that when the wheelchair is unfolded the half-pieces (18, 28) are in contact by their lateral sides (22, 32), opposite each other, the point (44) of one fitting into the crater (45) of the other and reciprocally.

6. The wheelchair according to claim 1, wherein each said lateral side (6) comprising said vertical upright bar (7) and said lower horizontal arm (15) together form an elbowed side bar bearing said upper arm (12) which sticks out perpendicularly from said upright bar (7) at an anchoring point located approximately within a lower third of said upright bar (7) and stretches horizontally towards the front of the wheelchair (1) within the plane of each lateral side (6) to bear the seat.

7. The wheelchair according to claim 1, wherein the ends of said upper arms (12) are shaped to receive accessories.

8. A collapsible wheelchair (1), comprising:

a chassis (2) formed of two identical separate lateral sides (6) each including at least one virtually vertical upright bar (7), and a lower arm (15) solid with said bar (7), and said chassis bearing a carrying wheel (10) at the back thereof and a guiding wheel (17) at the front thereof;

an upper arm (12) solid with said upright bar (7);

a seat (3), and a back (4) each including at least one piece connecting said lateral sides (6);

said seat (3) and said back (4) each being formed of two rigid, symmetrical half-pieces (18, 28) articulated between each other according to the median axis of the seat (3) and the back (4), respectively;

said lateral side (6) formed by said virtually upright bar (7) and said lower horizontal arm (15) together forming an elbowed side bar bearing said upper arm (12);

said upper arm sticking out perpendicularly from said upright bar (7) at an anchoring point located approximately within the lower third thereof and stretching horizontally towards the front of said wheelchair (1) within the plane of each said lateral side (6) to bear said seat (3);

each of said two half-pieces (18, 28) forming said seat (3) and said back (4) being formed of a first part with a rectangular transverse cross-section forming at least one of said outside wing (19, 29) of said seat (3) and a second central part (20, 30) with a virtually triangular transverse cross-section offering an upper surface (21) and a lateral side (22, 32) perpendicular to said upper surface (21) and a lower sloped side (25), said outside wing (19, 29) including on its external edge a tubular arrangement (24*a*) acting as hinge (24, 34) for associating in rotation said seat (3) to said upper arm (12) and said upright bar (7), the median part (20, 30) being equipped with a central hinge (27) stretching along the intersection between said lateral side (22, 32) and said lower side (25) in such a way that when said wheelchair (1) is in its unfolded position of use, said two half-pieces (18, 28) come against each other by their lateral sides (22, 32) and when the armchair (1) is in its folded position, said lateral sides (22, 32) are in the same plane.

* * * * *